(12) United States Patent
Gray

(10) Patent No.: US 7,337,956 B2
(45) Date of Patent: Mar. 4, 2008

(54) SYSTEM AND METHOD FOR FACILITATING THE PURCHASE OF GOODS AND SERVICES

(75) Inventor: R. O'Neal Gray, Dallas, TX (US)

(73) Assignee: Rearden Capital Corporation, Dallas, TX (US)

(*) Notice: Subject to any disclaimer, the term of this patent is extended or adjusted under 35 U.S.C. 154(b) by 152 days.

(21) Appl. No.: 10/821,988

(22) Filed: Apr. 12, 2004

(65) Prior Publication Data

US 2005/0224575 A1    Oct. 13, 2005

(51) Int. Cl.
*G06K 5/00* (2006.01)

(52) U.S. Cl. .................................. 235/380; 235/383

(58) Field of Classification Search ............... 235/379, 235/380, 383; 705/64

See application file for complete search history.

(56) References Cited

U.S. PATENT DOCUMENTS

| | | | |
|---|---|---|---|
| 4,614,861 A | | 9/1986 | Pavlov et al. |
| 4,701,601 A | | 10/1987 | Francini et al. |
| 5,140,517 A | | 8/1992 | Nagata et al. |
| 5,317,636 A | | 5/1994 | Vizcaino |
| 5,359,182 A | * | 10/1994 | Schilling ................ 235/380 |
| 5,557,518 A | * | 9/1996 | Rosen ..................... 705/69 |
| 5,572,004 A | * | 11/1996 | Raimann .................. 235/380 |
| 5,585,787 A | * | 12/1996 | Wallerstein ............ 340/5.42 |
| 5,591,949 A | * | 1/1997 | Bernstein ................ 235/380 |
| 5,710,887 A | | 1/1998 | Chelliah et al. |
| 5,711,012 A | | 1/1998 | Bottoms et al. |
| 5,726,893 A | | 3/1998 | Schuchman et al. |
| 5,890,137 A | | 3/1999 | Koreeda |
| 5,913,202 A | | 6/1999 | Motoyama |
| 5,914,472 A | * | 6/1999 | Foladare et al. .......... 235/380 |
| 5,960,411 A | | 9/1999 | Hartman et al. |
| 5,991,749 A | | 11/1999 | Morrill, Jr. |

(Continued)

FOREIGN PATENT DOCUMENTS

EP    1 331 582 A    7/2003

OTHER PUBLICATIONS

MASTERCARD INTERNATIONAL; Frequently Asked Questions About MasterCard SecureCode; 1994-2004, pp. 1-2.

(Continued)

*Primary Examiner*—Ahshik Kim
(74) *Attorney, Agent, or Firm*—Jones, Walker, Waechter, Poitevent, Carrere, & Denegre, L.L.P.

(57) ABSTRACT

A system and method for facilitating commercial transactions between a consumer and a supplier of goods at a point of sale and authorized by a credit holder. The credit holder possesses a communications device for prestoring transaction information in a data base. The communications device is operable by the credit holder for transmitting transaction information data and transaction authorization. The consumer possesses a consumer communications device for establishing a communications link between the consumer and the supplier. The consumer communications device generates a consumer request to the credit holders' communications device. A transaction approval device is in communications with the supplier and the consumer requested credit holder's communications device for receiving transaction requests from the supplier and for receiving transaction information data and authorization from the credit holder's communications device. The transaction approval device, upon receipt of transaction information data and transaction authorization, transmits approval to the supplier to complete the transaction.

6 Claims, 1 Drawing Sheet

U.S. PATENT DOCUMENTS

| | | | |
|---|---|---|---|
| 6,070,154 | A | 5/2000 | Tavor et al. |
| 6,088,683 | A | 7/2000 | Jalili |
| 6,104,726 | A | 8/2000 | Yip et al. |
| 6,138,917 | A | 10/2000 | Chapin, Jr. |
| 6,226,529 | B1 | 5/2001 | Bruno et al. |
| 6,250,557 | B1 * | 6/2001 | Forslund et al. ............ 235/492 |
| 6,311,167 | B1 * | 10/2001 | Davis et al. ................. 705/35 |
| 6,324,526 | B1 | 11/2001 | D'Agostino |
| 6,327,348 | B1 * | 12/2001 | Walker et al. ........... 379/91.01 |
| 6,378,075 | B1 | 4/2002 | Goldstein et al. |
| 6,446,048 | B1 | 9/2002 | Wells et al. |
| 6,493,338 | B1 | 12/2002 | Preston et al. |
| 6,598,031 | B1 | 7/2003 | Ice |
| 6,607,127 | B2 | 8/2003 | Wong |
| 6,609,113 | B1 | 8/2003 | O'Leary et al. |
| 6,611,818 | B1 | 8/2003 | Mersky et al. |
| 6,615,183 | B1 | 9/2003 | Kolls |
| 6,636,833 | B1 | 10/2003 | Flitcroft et al. |
| 6,662,020 | B1 | 12/2003 | Aaro et al. |
| 6,690,681 | B1 | 2/2004 | Preston et al. |
| 6,749,114 | B2 | 6/2004 | Madani |
| 6,798,762 | B1 | 9/2004 | Olson |
| 6,839,692 | B2 | 1/2005 | Carrott et al. |
| 7,090,123 | B2 | 8/2006 | Walker et al. |
| 2001/0039535 | A1 | 11/2001 | Tsiounis et al. |
| 2002/0001317 | A1 | 1/2002 | Herring |
| 2002/0026519 | A1 | 2/2002 | Tatsuo et al. |
| 2002/0049639 | A1 | 4/2002 | Tanaka et al. |
| 2002/0083008 | A1 | 6/2002 | Smith et al. |
| 2002/0128929 | A1 | 9/2002 | Urabe |
| 2002/0145043 | A1 | 10/2002 | Nagesh et al. |
| 2003/0014371 | A1 | 1/2003 | Turgeon |
| 2003/0028481 | A1 | 2/2003 | Flitcroft et al. |
| 2003/0066879 | A1 | 4/2003 | Cummins |
| 2003/0075610 | A1 | 4/2003 | Kin |
| 2003/0126076 | A1 | 7/2003 | Kwok et al. |
| 2003/0191945 | A1 | 10/2003 | Keech |
| 2003/0210708 | A1 | 11/2003 | Belotserkovsky |
| 2004/0019564 | A1 | 1/2004 | Goldthwaite et al. |
| 2004/0029469 | A1 | 2/2004 | Khan et al. |
| 2004/0029569 | A1 | 2/2004 | Khan et al. |
| 2004/0090992 | A1 | 5/2004 | Lee |
| 2004/0097217 | A1 | 5/2004 | McClain |
| 2004/0177005 | A1 | 9/2004 | Poltorak |
| 2004/0193553 | A1 | 9/2004 | Lloyd et al. |
| 2004/0243490 | A1 | 12/2004 | Murto et al. |
| 2005/0138429 | A1 | 6/2005 | Miura |

OTHER PUBLICATIONS

VISA; Verified by Visa; 2005, USA, p. 1.
Sankarson Banerjee, Senior Architect, Mphasis; Credit Card Security on the Net: Where is it today?; 2004, pp. 21-23.
VISA; How it Works; 2005, USA, pp. 1-2.
ENCORUS TECHNOLOGIES; Mobile Payments Examples: M-Commerce Opens up a World of Opportunities; 2002, pp. 1-11.
George Walsh and Gabriel Berger, Director of Research & Development, DCTI E-Payment Services; Alternative Payment Methods; Aug. 2000, pp. 1-8.
Vivo Tech; RF-Based Contactless Payment: A Moret Convenient Way to Pay; 2003, pp. 1-25.
Mark E. Peters, IBM Corporation; Emerging eCommerce Credit and Debit Card Protocols; pp. 1-8.
Tony Hegarty, Eric Verheul, Dirk Steuperaert, & Georgia Skouma; Study on the Security of Payment Products and Systems in the 15 Member States; Jun. 2003, pp. 1-124.

* cited by examiner

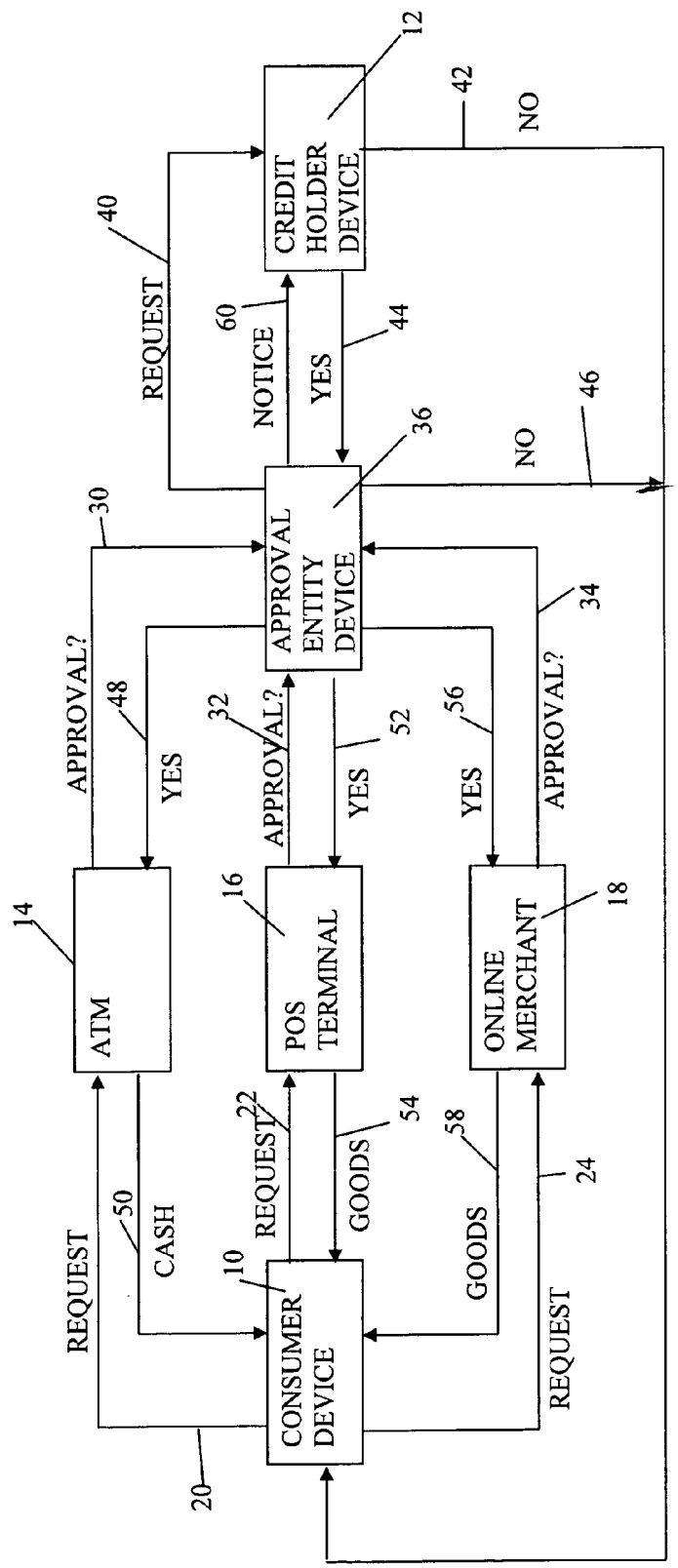

SYSTEM AND METHOD FOR FACILITATING THE PURCHASE OF GOODS AND SERVICES

TECHNICAL FIELD OF THE INVENTION

The present invention relates to a commercial transaction system and method, and more particularly to a system and method for purchasing goods and services at a point of sale using prestored transaction data in the possession of a credit holder located at a facility remote from the point of sale to facilitate the purchase of goods and services.

BACKGROUND OF THE INVENTION

Currently, a consumer must be present at a point of sale to present a consumer's credit card, debit card, check or other mechanism for payment. The consumer may not be able to complete the purchase, in the event of loss of a credit card. Traditional purchase of goods and services at a point of sale require that a credit card holder be present at the time of the purchase. However, the actual consumer may not be a credit card holder, and may request that a credit card holder loan the credit card to the consumer in which event the credit card holder is without any control as to how the credit card is to be used by the consumer. Further disadvantages with the use of credit cards involve the number of transaction documents generated including credit/debit slips, checks, etc.

The use of credit cards, checks and debit cards creates a problem in the event the owner looses these transaction facilitating instruments. The credit card issuer must cancel the card, a financial institution must put stop/hold on checks or accounts must be closed. The consumer must then open new accounts and be issued new credit cards.

A need has thus arisen for a system and method for conducting transactions at a point of sale where a credit holder may be located remotely from the point of sale and where there credit holder can control the transaction from the remote location.

SUMMARY OF THE INVENTION

In accordance with the present invention, a system and method for facilitating commercial transactions between a consumer and a supplier of goods and services at a point of sale and authorized by a credit holder located remote from the point of sale is provided. The credit holder possesses a communications device including a memory device for prestoring transaction information in a data base. The communications device is operable by the credit holder for transmitting transaction information data and transaction authorization. The consumer possesses a consumer communications device for establishing a communications link between the consumer and the supplier of goods and services. The consumer communications device generates a consumer request to the credit holders' communications device. A transaction approval device is in communications with the supplier and the consumer requested credit holder's communications device for receiving transaction requests from the supplier initiated by the consumer communications device and for receiving transaction information data and authorization from the credit holder's communications device. The transaction approval device, upon receipt of transaction information data and transaction authorization, transmits approval to the supplier of goods and services to complete the transaction initiated by the consumer's communications device.

BRIEF DESCRIPTION OF THE DRAWING

For a more complete understanding of the present invention and for further advantages thereof, reference is now made to the following Description of the Preferred Embodiments taken in conjunction with the accompanying Drawing which is a block diagram of the present system.

DESCRIPTION OF THE PREFERRED EMBODIMENTS

Referring to the Figure, the present system and method facilitates commercial transactions initiated by a consumer having a consumer communications device 10 where the purchase or sale is authorized by a credit holder located at the point of sale (POS) or remotely from the point of sale. The authorizing credit holder has in his/her possession a credit holder device 12. Consumer communications device 10 may comprise, for example, a telephone, cellular telephone, personal digital assistant (PDA), wireless communications device, desktop or notebook computer, or other communications device to establish a communications link between a consumer and a supplier of goods and services. The supplier of goods and services may include, for example, an automatic teller machine (ATM) 14, a terminal 16 or an internet online merchant 18. Consumer device 10 initiates a request via communications link 20 to ATM 14, via communications link 22 to POS terminal 16 and via communications link 24 to online merchant 18. The request via communications links 20, 22 and 24 may be downloaded from consumer device 10 via a direct connection, such as, for example, a head phone jack, from consumer device 10; via audio tones from a speaker contained within consumer device 10; or from a pop-out extension from consumer device 10 that includes a magnetic stripe or smart chip device readable by ATM 14, POS terminal 16 or online merchant 18. The requests initiated on communications links 20, 22 and 24 are in the form of a request for approval from the credit holder to approve the transaction initiated by the consumer. The requests for approval are transmitted by ATM 14 via a communications link 30 to an approval entity device 36. Approval entity device 36 may comprise, for example, a financial institution or credit card company through which the credit holder transacts financial business. POS terminal 16 communicates with approval entity device 36 via a communications link 32. Online merchant 18 communicates with approval entity device 36 via a communications link 34.

After receipt of a request for approval from consumer device 10, approval entity device 36 initiates a request via a communications link 40 to credit holder device 12. Credit holder device 12 in the possession of the credit holder informs the credit holder that a request has been made by a consumer using consumer device 10. Credit holder device 12 may include, for example, a cellular telephone, personal digital assistant, wireless communications device, desktop or notebook computer or other communications device to establish a communications link between the credit holder and approval entity device 36. Credit holder device 12 includes a keypad for use by the credit holder and a memory for storing transaction data input by the credit holder into communications device 12. Transaction data includes, for example, credit holder credit card numbers, financial institution data and other information utilized by an approval entity.

The credit holder utilizing credit holder device 12 may disapprove of the transaction initiated by the consumer utilizing consumer device 10 in which event, the request is rejected via a communications link 42 to consumer device 10. Such a communications link may comprise, for example, a cellular telephone link. If the credit holder approves the financial transaction initiated by the consumer, credit holder device 12 initiates a transaction authorization which is communicated to approval entity device 36 via a communications link 44. The credit holder initiates the transaction authorization by entering, for example, a personal identification number into credit holder device 12 in order to initiate the transaction authorization via communications link 44.

The financial approval entity may accept or reject the transaction authorization. In the event of a rejection, approval entity device 36 generates a disapproval of the transaction via a communications link 46 to consumer device 10. In the event of approval, approval entity device 36 generates an approval indication to ATM 14 via a communications link 48, to POS terminal 16 via communications link 52 or to online merchant 18 via a communications link 56. Upon receipt of the approval for the transaction initiated by credit holder device 12, ATM 14 signals approval to consumer device 10 via a communications link 50. POS terminal 16 signals the authorization to consumer device 10 via a communications link 54, and online merchant 18 signals acceptance of the transaction via communications link 58 to consumer device 10.

In use, the consumer utilizing consumer device 10 at a point of sale, inputs into the consumer device 10 a contact number, such as, for example, a cell telephone number. POS terminal 16 transmits the sales amount, store's name, and any other basic information to the financial institution's approval entity device 36 which is responsible for approving the credit/debit/check sales transaction. The financial institution while processing the credit approval, initiates the request for approval via communications link 40 to credit holder device 12. Credit holder device 12 produces an indication that a request has been made for transaction authorization in the form of an audio or visual indication to the credit holder in possession of device 12. The credit holder utilizing device 12 may indicate which stored credit, debit or checking account is to be used to fund the transaction, and approves the request for authorization by pressing a function key such as, for example, a send button on device 12. The transaction authorization is sent to the approval entity device 36, and the approval entity then completes the approval process and forwards the approval to the POS terminal 16.

Use of the present system, enables the consumer to be located at a remote location from the credit holder which eliminates the need for a credit holder to wire funds to a consumer, since the consumer is able to obtain funds, for example, from an ATM 14.

In the event that credit holder device 12 is lost by the credit holder, the credit holder can contact the approval entity, and the approval entity can download the credit holder's information into a new device 12.

Therefore, it can be seen that the present system does not require a credit card to be utilized in order to facilitate a commercial transaction at a point of sale terminal. The present system does not require a personal trusted device (PTD) to complete a transaction. Transactions are approved in real time. The credit holder can provide cash or credit over long distances without the necessity of using a third party provider as a transfer agent. The credit holder can utilize the present system without the need for having multiple credit, debit cards or paper checks in his/her possession, since all information is held within credit holder device 12. The credit holder can utilize credit holder device 12 within the present system for initiating financial transactions without the need of credit cards.

As used herein, communications links include, for example, open, wireless data exchange such as, for example, Bluetooth, WI-FI, infrared, between consumer device 10 and ATM 14, POS terminal 16 and online merchant 18. Other communications links include cellular telephone lines and land lines. Safeguards are provided since credit card and verification information are not simultaneously transmitted at any time during the transaction and the transaction is further safe-guarded by credit holder device 12 requiring the personal identification number of the credit holder.

Other alteration and modification of the invention will likewise become apparent to those of ordinary skill in the art upon reading the present disclosure, and it is intended that the scope of the invention disclosed herein be limited only by the broadest interpretation of the appended claims to which the inventor is legally entitled.

The invention claimed is:

1. A system for facilitating commercial transactions between a consumer and a supplier of goods and services at a point of sale which transactions are authorized by a credit holder comprising:

a credit holder communications device including a memory device for prestoring transaction information in a database, said credit holder communications device being operable by the credit holder for generating transaction information data and transaction authorization;

a consumer communications device for establishing a communications link between the consumer and the supplier of goods and services, said consumer communications device generating a consumer request to said credit holder communications device;

a transaction approval device in communications with the supplier of goods and services and the consumer requested credit holder communications device for receiving transaction requests from the supplier of goods and services initiated by the consumer utilizing said consumer communications device and for receiving transaction information data and authorization from said credit holder communications device; and said transaction approval device upon receipt of transaction information data and transaction authorization, transmitting approval to the supplier of goods and services to complete the transaction initiated by the consumer utilizing said consumer communications device.

2. The system of claim 1 wherein said credit holder communications device and said consumer communications device are located at remote locations from each other.

3. The system of claim 1 wherein said credit holder communications device and said consumer communications device is selected from the group comprising a telephone, personal digital assistant, wireless communications device, desktop computer and notebook computer.

4. A method for facilitating commercial transactions between a consumer and a supplier of goods and services at a point of sale which transactions are authorized by a credit holder comprising:

prestoring transaction information in a database of a credit holder communications device including a memory device, the credit holder communications device being operable by the credit holder for generating transaction information data and transaction authorization;

establishing a communications link using a consumer communications device between the consumer and the supplier of goods and services, the consumer communications device generating a consumer request to the credit holder communications device;

receiving at a transaction approval device in communications with the supplier of goods and services and the consumer requested credit holder communications device, transaction requests from the supplier of goods and services initiated by the consumer utilizing the consumer communications device and for receiving transaction information data and authorization from the credit holder communications device; and transmitting approval from the transaction approval device upon receipt of transaction information data and transaction authorization, to the supplier of goods and services to complete the transaction initiated by the consumer utilizing the consumer communications device.

5. The method of claim 4 wherein the credit holder communications device and the consumer communications device are located at remote locations from each other.

6. The method of claim 4 wherein the credit holder communications device and the consumer communications device is selected from the group comprising a telephone, personal digital assistant, wireless communications device, desktop computer and notebook computer.

* * * * *